US011803840B1

(12) United States Patent
Smith et al.

(10) Patent No.: US 11,803,840 B1
(45) Date of Patent: *Oct. 31, 2023

(54) METHOD AND SYSTEM FOR OBFUSCATING SENSITIVE PERSONAL DATA AVAILABLE ON UNREGULATED PLATFORMS

(71) Applicant: Tintra 3.0 Limited, London (GB)

(72) Inventors: David Peter Smith, Cramlington (GB); Joseph Michael William Lyske, Bromley (GB)

(73) Assignee: Tintra 3.0 Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,423

(22) Filed: Mar. 25, 2023

Related U.S. Application Data

(63) Continuation-in-part of application No. 17/857,102, filed on Jul. 4, 2022, now Pat. No. 11,615,399.

(30) Foreign Application Priority Data

Jun. 14, 2022 (GB) .................................... 2208742
Jun. 29, 2022 (GB) .................................... 2209572

(51) Int. Cl.
*G06Q 20/40* (2012.01)
*G06Q 20/36* (2012.01)

(52) U.S. Cl.
CPC ..... *G06Q 20/3674* (2013.01); *G06Q 2220/18* (2013.01)

(58) Field of Classification Search
CPC ....................... G06Q 20/3674; G06Q 2220/18
See application file for complete search history.

(56) References Cited

U.S. PATENT DOCUMENTS

| 11,263,703 B2 | 3/2022 | Juban et al. |
| 11,443,838 B1* | 9/2022 | Cordonnier ............ G16H 40/20 |
| 11,615,399 B1* | 3/2023 | Smith ................ G06Q 20/4014 |
| | | 705/65 |
| 2020/0005284 A1 | 1/2020 | Vijayan |

(Continued)

FOREIGN PATENT DOCUMENTS

KR  102381499 B1  4/2022

OTHER PUBLICATIONS

Letter from UK Examiner dated Jan. 30, 2023 in GB2209572.3 (3 pages).

(Continued)

*Primary Examiner* — Steven S Kim
*Assistant Examiner* — Nakia Leffall-Allen
(74) *Attorney, Agent, or Firm* — YOUNG LAW FIRM, P.C.

(57) ABSTRACT

Method and system for verifying authenticity of specific personal data responsive to a unique wallet address on a public ledger of an unregulated platform. The wallet contains one or more non-transferable NFTs, each locked to the wallet and related to specific personal data. The non-transferable NFT was minted from a regulated platform to which there is a record in the public ledger. Supplying the unique address of the wallet to a service supplier affects a log-in of a client to the service supplier, whereafter message interactions over a network between the service supplier and the unregulated platform permits searching for a relevant non-transferable NFTs stored in the wallet and related to the specific personal data. Return of any relevant non-transferable NFT related to the personal data thus verifies authenticity of the specific personal data by association with a regulated platform.

6 Claims, 3 Drawing Sheets

(56) References Cited

U.S. PATENT DOCUMENTS

| | | | |
|---|---|---|---|
| 2021/0304200 A1 | 9/2021 | Doney et al. | |
| 2022/0058633 A1* | 2/2022 | Yantis | G06Q 20/3676 |
| 2022/0122062 A1* | 4/2022 | Mayblum | G06Q 20/381 |
| 2022/0210061 A1* | 6/2022 | Simu | G06Q 20/3829 |
| 2022/0383303 A1* | 12/2022 | Mullen | G06Q 20/389 |

OTHER PUBLICATIONS

UKIPO Combined Search and Examination Report dated Jan. 30, 2023 in GB2209572.3 (6 pages).
UKIPO Search Report dated Jan. 27, 2023 in GB2209572.3 (1 page).
Decentralized Identifiers (DIDs) v1.0 Core architecture, data model, and representations W3C Recommendation Jul. 19, 2022, downloaded from https://www.w3.org/TR/did-core/ (113 pages).
Verifiable Credentials Data Model v1.1. W3C Recommendation Mar. 3, 2022, downloaded from https://www.w3.org/TR/vc-data-model/ (130 pages).
Content-addressable storage From Wikipedia, the free encyclopedia, downloaded from https://en.wikipedia.org/wiki/Content-addressable_storage on Oct. 14, 2022 (7 pages).
Sustainable KYC through Blockchain Technology in Global Banks Article in Annals of Dunarea de Jos University of Galati Fascicle I Economics and Applied Informatics • Jul. 2019 DOI: 10.35219/eai1584040929 (6 pages).
Nikolaos Kapsoulis et al., Know Your Customer (KYC) Implementation with Smart Contracts on a Privacy-Oriented Decentralized Architecture, Future Internet 2020, 12, 41; doi:10.3390/fi12020041 www.mdpi.com/journal/futureinternet (13 pages).
Prince Sinha et al., Decentralized KYC System, International Research Journal of Engineering and Technology (IRJET), vol. 05, Issue 08, Aug. 2018 e-ISSN: 2395-0, p-ISSN: 2395-0 (7 pages).
Yadav, Ashok & Bajpa, Ramendra. (2020). KYC Optimization using Blockchain Smart Contract Technology. International Journal of Innovative Research in Applied Sciences and Engineering. 4. 669-674. 10.29027/IJIRASE.v4.i3.2020.669-674. (7 pages).
Schlatt, Vincent & Sedimeir, Johannes & Feulner, Simon & Urbach, Nils. (2021). Designing a Framework for Digital KYC Processes Built on Blockchain-Based Self-Sovereign Identity (49 pages).

* cited by examiner (connection architecture continued on FIG. 1b)

(continuation of FIG. 1a)

METHOD AND SYSTEM FOR OBFUSCATING SENSITIVE PERSONAL DATA AVAILABLE ON UNREGULATED PLATFORMS

FIELD OF THE INVENTION

This invention relates, in general, to a client authentication process establishing account associations across multiple independent and disparate platforms. Particularly, but not exclusively, the invention is applicable a method and system that obfuscates and authenticates personal data that otherwise would be necessarily communicated over an open public network supporting third generation internet services, such as web 3.0 and generally an unregulated environment, in order to secure access to third-party services.

SUMMARY OF THE PRIOR ART

Blockchain is essentially a distributed database that is shared among the nodes of a public computer network. As a database, a blockchain stores information electronically in digital format. Blockchains are best known for their role in cryptocurrency systems, such as Bitcoin, and are arranged to maintain a secure and decentralized record of transactions. The concept behind blockchain is that it guarantees the fidelity, integrity, and security of a record of data and generates trust without the need for a trusted third party. However, on a generally never basis, an individual or organization cannot control or manipulate the protocol behind a cryptocurrency because it is cryptographically secure. Furthermore, there is no, little or limited and ineffectual regulation of certain aspects of blockchains on both a national or international governmental level, with this lack of oversight leading to questionable use of block technology in potentially dubious or otherwise entirely illegal activities, such as money laundering, terrorist financing or narcotics trafficking in the latter case.

One key difference between a typical database and a blockchain is how the data is structured. A blockchain collects information together in groups, known as blocks, which hold sets of information. Blocks have certain storage capacities and, when filled, are closed and linked to the previously filled block thus forming the "blockchain". All new information that follows that freshly added block is compiled into a newly formed block that will then also be added to the chain once filled. A conventional database usually structures its data into tables, whereas a blockchain, like its name implies, structures its data into chunks (blocks) that are strung together. This data structure inherently makes an irreversible timeline of data when implemented in a decentralized nature. When a block is filled, it is set in stone and becomes a part of this timeline. Each block in the chain is given an exact time stamp when it is added to the chain.

Blockchain technology is, for example, the basis for cryptocurrency transactions, such as supported by Bitcoin. Another platform is Ethereum which is both similar and dissimilar to Bitcoin. For example, both are cryptocurrencies that can be traded, and both are acquired through mining activity of a numerically limited pool of coins or tokens. Cryptocurrencies are fungible in that one ETH can be exchanged for a different ETH without any consequence or loss.

Other blockchain technologies, such as Solano, exist. These may have certain advantages or disadvantages relative to more accepted mainstream blockchains of Bitcoin and Ethereum.

In dealing with blockchain cryptocurrencies, it is typical to use a cryptocurrency exchange firm, such as CoinBase. Coinbase is a cryptocurrency trading and investing platform that offers users the ability to buy, sell, and exchange over one hundred tradable cryptocurrencies such as Bitcoin, Ethereum, and Dogecoin. Unlike traditional brokerage firms, cryptocurrency exchanges are generally not members of the Securities Investor Protection Corp. (SIPC) and the like. Therefore, unless user terms specify otherwise, investors with cryptocurrency assets commingled on a custodial cryptocurrency exchange could potentially lose their funds as unsecured creditors. Coinbase, however, is regulated in the UK by the UK Financial Conduct Authority because such blockchain financial transactions are subject to regulatory approval/control, although the specific form of account/wallet holder validation is not known.

Contrastingly, non-fungible tokens "NFTs" are unique digital assets addressing certifiable things, for example, photographs, music, videos, and trading cards. Consequently, NFTs are not mutually interchangeable/fungible since each NFT is in itself unique. NFTs are managed in a digital ledger and traded on the web. For instance, rather than buying a genuine photo to show on a divider, the purchaser gets a unique digital file. Nearly any digital asset, for example, a piece of collectible advanced characters, virtual land, or unique online media posts, can be made and bought as an NFT. NFTs are joined to explicit qualities with certificates of authenticity, which means that the digital assets cannot be traded or supplanted with each other because each NFT exists on a decentralized digital platform.

Ethereum is a decentralized global software platform having its own native cryptocurrency, the ether or "ETH", and it has an operational protocol that offers incentives to process transactions and computational activities. The ETH is compatible with and enables use of NFTs. Moreover, the ETH supports decentralized finance, decentralized autonomous organizations, and the unregulated Metaverse. Ethereum can be used by anyone to create any secured digital technology they can think of. It has a token designed for use in the blockchain network, but it can also be used by participants as a method to pay for work done on the blockchain. The blockchain technology that powers Ethereum enables secure digital ledgers to be publicly created and maintained.

Decentralized applications (dApps) are digital applications or programs that exist and run on a blockchain or peer-to-peer (P2P) network of computers instead of a single computer. DApps (also called "dapps") are outside the purview and control of a single authority. DApps can be developed for a variety of purposes including gaming, finance, and social media. Since dApps are decentralized, they are free from the control and interference of a single authority and therefore safeguard user privacy but have a lack of censorship.

With non-regulated platforms, such as Bitcoin and Ethereum, the setting up of the account simply requires an account hash or account/wallet address to be established. For example, it would be possible to set up a blockchain account based on a user pseudo-name "Yogi Bear" rather than conventionally just a wallet address, and then to fill the resultant established wallet with mined currency or acquired cryptocurrency having financial real-world tradeable worth/value. The wallet may also include NFTs. In other words, in setting up such unregulated wallets there is no need to supply or validate personal identification "ID", with the resulting cryptocurrency wallet not linked to a person in any way. The lack of any relationship means that, in the exemplary case of monetary transaction in commercial transactions, the non-regulated platform cannot be broken down (1) to identify the owners of particular wallets [which is evidently advantageous for anyone who is morally corrupt and involved in illegal activities, such as blackmail and trafficking], (2) to identify the chain of custody of any value in the wallet, (3) to identify or track the value in a particular wallet, and (4) is problematic for those individuals who have legitimate business reasons for trading in blockchain coins/tokens on non-regulated platforms and for whom establishment of trust is important.

There is also a second, flip side to the problem of anonymity in non-regulated platforms. That is, when the need arises to communicate personal data through a non-regulated platform for reasons of validation of an individual, it either cannot be done or otherwise the communicated personal data must be entirely open/visible to the recipient and thus subject to potential unwanted hacking, data scraping and subsequent general misuse.

With Ethereum wallets and similar wallets on other unregulated platforms, a particular commercial issue arises with banking transactions. Particularly, there is no present way to establish (a) the actual real identity of the owner (i.e., the user of the wallet is a proxy/front for someone else or otherwise is fake) and/or (b) the provenance of the wallet's content value since the wallet's owner has not gone through any validating sign-off. Consequently, use of an (exemplary) Ethereum wallet is restricted in monetary/banking commerce because of the failure to confirm compliance with anti-money laundering "AML" regulations. This is a technical security problem In terms of banking transaction security and protection measures, these cart in fact be broadly classified as issues relating either to AML and/or Know Your Customer "KYC". To date, commercial banking institutions attempt to restrict use of transaction, especially cryptocurrencies, by imposing unrealistic or prejudicial levels of AML and/or KYC compliance based on the identification of countries of perceived concern, e.g., Albania, Cayman Islands, Malta, Iran and others [at June 2022], as reflected by the Law Society (see https://www.lawsociety.org.uk/topics/anti-money-laundering/high-risk-third-countries-for-aml-purposes). This list of affected countries varies with time based on global economic and political reports that weight and/or prejudice individuals based on association with the individual's movements and geography. The present banking regime simply makes compliance with AML/KYC very difficult in these countries of concern principally because there presently exists no robust technical solution that links unregulated accounts [making use of blockchain] into a regulated environment [in which an individual would be concerned trustworthy based on a verified legitimate identity of a person who is both determined legally safe/regulatory compliant and who is operating a crypto-wallet]. KYC accreditation is, in other words, presently based on hard-coded and inflexible questions and a rule-based ground truth where the risk is assessed as either black (high) or low (white/approved) and in which shades of grey are either forcibly ignored and subjected to frequently unnecessary, resource expansive and unproductive enhanced due diligence consideration.

For cross-geographical financial transactions using cryptocurrencies traded over web 3.0, more efficient mechanisms are required to see both or either the effective usage of enhanced web facilities and the non-prejudice treatment of individuals having respectively legitimate commercial trading intent and credible and verifiable physical presence, i.e., the account holder is a real and honest individual.

SUMMARY OF THE INVENTION

According to a first aspect of the invention there is provided a trading system having: a regulated platform comprising: system intelligence based in at least one private server administering operational aspects of the regulated platform; and a private ledger database, coupled to the at least one private server, storing a plurality of regulated wallets each referenced with a unique private wallet address and an association to an account holder; and an unregulated platform comprising at least a public ledger database in which is stored a plurality of unregulated wallets; wherein the system intelligence is arranged to: establish each regulated wallet by verifying an identified account holder through authenticating a plurality of instances of personal data for the identified account holder as submitted electronically to the regulated platform; and issue a uniquely coded certificate for each instance of personal data; store in the private ledger an association between each said issued coded certificate and its respective established wallet, where the association includes an indication of the nature of the instance of the personal data; and cause said each stored coded certificate to be minted into the public ledger database (66) and associated with an unregulated public wallet, wherein minting of the coded certificate produces a non-transferable non-fungible token "NFT" locked to the unregulated public wallet.

The non-transferrable NFTs contain metadata imbued with descriptive data pertaining to one of the natures of a related transaction, an event involving the regulated wallet or a document type.

In an embodiment the system intelligence of the regulated platform includes a private certificate module, and the unregulated platform includes a public certificate module operationally coupled to the public ledger database, and wherein the public certificate module cooperates with the private certificate module through a smart contract with a public domain blockchain, said smart contract preventing alternation of the non-transferable NFT within its unregulated public wallet but allowing access to the non-transferable NFT.

In a second aspect of the invention there is provided a method of linking an unregulated digital wallet on an unregulated trading platform to a regulated digital wallet on a regulated trading platform and wherein the regulated digital wallet is associated with a known client, the method comprising: during establishment of a first regulated digital wallet, generating a first hash for each of a plurality of personal documents submitted electronically to the regulated trading platform to satisfy regulatory requirements for establishing the regulated digital wallet in the name of the known client, and storing in the regulated trading platform an association between the first hash and the first regulated digital wallet; minting each hash to produce non-transferable non-fungible tokens "NFTs" locked to the unregulated public wallet of the unregulated trading platform; and linking the unregulated digital wallet to the first regulated digital wallet when said non-transferable non-fungible tokens "NFTs" are within the unregulated public wallet.

In another aspect of the invention there is provided a method of linking an unregulated digital wallet having a digital address on an unregulated trading platform to a regulated digital wallet on a regulated trading platform and wherein the regulated digital wallet is associated with a known client, the method comprising: verifying an identity of a prospective account holder seeking to establish a first regulated digital wallet by authenticating a plurality of instances of personal data submitted by the prospective account holder; issuing, as a hash, a certificate for each instance of personal data and associating, in a private ledger database of the regulated trading platform, each hash with at least a document type and the first regulated digital wallet to establish a cryptocurrency account for the prospective account holder; receiving, via an app providing an interface to operational system intelligence of the regulated trading platform, a link to a first unregulated digital wallet including a first digital address therefor; using the link, automatically interrogating the first unregulated digital wallet to recover data entries reflecting at least one of transactional entries, recorded wallet interactions, NFTs, general personal data and uses of cryptocurrency; based on recovered data entries, identifying searchable links to third-party databases independent of the unregulated trading platform and independent of the regulated trading platform, scraping said third-party databases for personal data or further links related to operation of the first unregulated digital wallet, and returning scraped data to generate a profile of a registrant of the first unregulated digital wallet; based on the profile, parsing said returned scraped data to generate a list of different document types each with a respective associated document; within the private ledger database, identifying any commonality between said list of different document types and the document type linked to the first regulated digital wallet; in the event that there is at least one identified commonality in the document type and a content match exists between the respective associated document and a verified document associated with the first regulated digital wallet, evaluating an honesty score associated with the content match; and determining if the honesty score exceeds a threshold and, when it does, linking the first unregulated digital wallet to the first regulated digital wallet by minting a non-transferable non-fungible token "NET" for storage in at least the first unregulated digital wallet.

In an embodiment, the method further includes the steps of: in the event of failing to identify commonality, generating at least one random challenge from selected content in said returned scraped data and displaying the at least one random challenge on the interface of the app; monitoring a response to the at least one random challenge and assessing correctness of the response; in the event of correlation of the response to the selected content of the random challenge, generating a second hash for the selected content; associating the second hash with at least one of the first regulated digital wallet and the first unregulated digital wallet; and using the second hash to verify a common ownership of the first regulated digital wallet and the first unregulated digital wallet.

Embodiments of the invention therefore support the authentication of independent accounts supported on independent platforms and, particularly, the linking of regulated and unregulated accounts that share a common account owner, Embodiments provide for rapid linking of those different accounts, with the regulated account providing proxy validation of the unregulated account thereby permitting the unregulated account to enjoy transaction freedom in the movement of value into and out of the unregulated account irrespective of whether the movement is to or from a regulated platform. The invention therefore provides, in embodiments of a first aspect, a secure and reliable validation service that can quickly authenticate and legitimize chain of custody and tide in stored coins and/or NFTs in wallets initially established on unregulated platforms. This is particularly significant with respect to AML and KYC clearance, and web 3.0 applications. Indeed, the KYC and AML processes are leveraged to show credibility and/or credit worthiness of an unregulated wallet, such as an Ethereum wallet or the like. The regulated platform therefore acts as a proxy for validation.

In a fourth aspect of the invention there is provided a method of linking an unregulated digital wallet having a digital address on an unregulated trading platform to a regulated digital wallet on a regulated trading platform and wherein the regulated digital wallet is associated with a known client, the method comprising: verifying an identity of a prospective account holder seeking to establish a first regulated digital wallet by authenticating a plurality of instances of personal data submitted by the prospective account holder; issuing, as a hash, a certificate for each instance of personal data and associating, in a private ledger database of the regulated trading platform, each hash with at least a document type and the first regulated digital wallet to establish a cryptocurrency account for the prospective account holder; using the plurality of instances of personal data to identify at least one link to a first unregulated digital wallet having a first digital address therefor; using said at least one link, automatically interrogating the first unregulated digital wallet to recover data entries in the first unregulated wallet reflecting at least one of transactional entries, recorded wallet interactions, NFTs, general personal data and uses of cryptocurrency; based on recovered data entries, identifying searchable links to third-party databases independent of the unregulated trading platform and independent of the regulated trading platform, scraping said third-party databases for personal data or further links related to operation of the first unregulated digital wallet, and returning scraped data to generate a profile of a registrant of the first unregulated digital wallet; based on the profile, parsing said returned scraped data to generate a list of different document types each with a respective associated document; within the private ledger database, identifying any commonality between said list of different document types and the document type linked to the first regulated digital wallet; in the event that there is at least one identified commonality in the document type and a content match exists between the respective associated document and a verified document associated with the first regulated digital wallet, evaluating an honesty score associated with the content match; and determining if the honesty score exceeds a threshold and, when it does, linking the first unregulated digital wallet to the first regulated digital wallet by minting a non-transferable non-fungible token "NFT" for storage in at least the first unregulated digital wallet.

In yet another aspect of the invention there is provided a method of verifying authenticity of specific personal data based on supply of a wallet address stored on a public ledger database of an unregulated platform, wherein the public ledger database contains a first wallet having a unique address and containing one or more non-transferable non-fungible tokens "NFTs" locked to the first wallet and wherein each non-transferable NFT was minted from a regulated platform to which there is a record in the public ledger database, the method comprising: supplying the unique address of the first wallet to a service supplier to affect a log-in of the service provider into the first wallet; through message interaction over a network between the service supplier and the unregulated platform, searching for a record of specific personal data in the public ledger database to locate non-transferable NFTs stored in the first wallet and related to the specific personal data; and at the service supplier, verifying authenticity of the specific personal data through return, over the network and from the first wallet, of at least one relevant non-transferable NFT related to the personal data.

In still yet another aspect of the invention there is provided a computer-implemented system linking an unregulated digital wallet having a digital address on an unregulated trading platform to a regulated digital wallet on a regulated trading platform and wherein the regulated digital wallet is associated with a known client, the computer-implemented system comprising: a first server arranged to verify an identity of a prospective account holder seeking to establish a first regulated digital wallet by authenticating a plurality of instances of personal data submitted by the prospective account holder; a certificate module arranged to issue, as a hash, a certificate for each instance of personal data, wherein each hash has a stored association, stored within a private ledger database of the regulated trading platform, with at least a document type and the first regulated digital wallet and wherein issued certificates confirm the identity of the prospective account holder to permit establishment of a legitimized cryptocurrency account in the name of the prospective account holder that is linked to first regulated digital wallet; a communications device running an app providing an interface to operational system intelligence of the regulated trading platform, the app configured to receive a link to a first unregulated digital wallet having a first digital address therefor; a linkage module responsive to the link, the linkage module arranged automatically to interrogate the first unregulated digital wallet to recover data entries in the first unregulated wallet reflecting at least one of transactional entries, recorded wallet interactions, NFTs, general personal data and uses of cryptocurrency; system intelligence, response to recovered data entries, arranged to identify searchable links to third-party databases that are independent of the unregulated trading platform and also independent of the regulated trading platform, an OSINT module arranged to scrape said third-party databases for personal data or further links related to operation of the first unregulated digital wallet, and further arranged to return scraped data to generate a profile of a registrant of the first unregulated digital wallet; system intelligence, responsive to said generated profile, arranged to parse said return scraped data to generate a list of different document types each with a respective associated document; system intelligence arranged to identify any commonality between said list of different document types and the document type, within the private ledger database, linked to the first regulated digital wallet; system intelligence arranged to evaluate an honesty score associated with a content match identified as arising between the respective associated document and a verified document associated with the first regulated digital wallet; and system intelligence arranged to determine if the honesty score exceeds a threshold and, when it does, to cause the certificate module to mint a non-transferable non-fungible token "NFT" for storage in at least the first unregulated digital wallet, thereby linking the first unregulated digital wallet to the first regulated digital wallet.

Another aspect of the invention provides a networked system comprising: a third-party service platform having a first server at least partially administering access to services, said services obtained subject to receipt of authenticated personal data of a client and subsequent to supply of log-in data for the client, wherein said log-in data is receivable via a user interface through which a unique address of a first digital wallet of the client is obtained; an unregulated trading platform remote to the third-party service platform, the unregulated trading platform having a public server and a public ledger database in which is stored a plurality of unique wallet addresses including that of the first digital wallet and wherein the first digital wallet contains one or more non-transferable non-fungible tokens "NFTs" locked to the first digital wallet and wherein each non-transferable NFT was minted from a regulated platform to which there is a record in the public ledger database; a network providing a communication backbone through which the first server can communicate with the public server and obtain access to information stored in the first digital wallet; and wherein the first server is arranged: through message interaction over the network with the public server, to search for a record of specific personal data in the public ledger database to locate non-transferable NFTs stored in the first wallet and related to the specific personal data, and through message interaction over the network, to receive at least one encoded certificate within a relevant non-transferable NFT, from the first wallet, related to the specific personal data; and to provide access to the services based on receipt of the at least one encoded certificate that verifies authenticity of the specific personal data through association of the at least one encoded certificate with the regulated platform.

At least some of the various embodiments of the present invention provide for a technically validated approach to linking together of regulated (private) and unregulated (public) cryptocurrency wallets to produce and approved/compliant hybrid system supporting a global transaction scheme that functions irrespective of client location. The antiquated former approach where individuals are simply assessed based on a geographic prejudice is removed by a new approach to interrogation that makes use of selective scraping of data, in third-party database resources, relating to or associated with events or transaction recorded in the public (unregulated) wallet that belongs to an initially unknown individual whose identity requires verification for linking purposes. The embodiments thus avoid assessment of documents that can be fraudulently presented or faked, since responses to randomly generated queries raised in the linkage process are based on relevant data scraped from third party providers with whom the public wallet—and thus its real owner—has monitored and recorded interactions. In the event of a verified response to such a randomly generated query, a non-transferrable NFT is generated by the system intelligence of the regulated platform and these non-transferable NFTs are placed within an accessible public ledger 66 as well as the purview of the private ledger. When sufficient correlation of responses occurs, linking can be established. The certificates provide a record of associations and go to the credibility and integrity of transactions, documents and wallet owners.

Embodiments of the present invention provide separate coded (hash) certificates for each document or reported interaction entry, including proactively providing recordable updates reporting monthly repayment of loans and other relevant client-orientated transactions, with those certificates preferably being in the form of non-transferrable NFTs containing metadata imbued with descriptive data pertaining to the nature of the related transaction, event or document type. The approaches described thus allow for a third-party FINTECH to avoid KYC based on former accreditation and verification of personal identity by and through a regulated platform and an established private crypto-wallet.

In overview, the various complementary embodiments concern, amongst other concepts, a verification and authentication process of independent digital wallets and, particularly, the linking of regulated and unregulated digital wallets when there is established common ownership and a desire to achieve rapid linking of those different accounts supported across disparate platforms for inter-dependent wallet operation. System intelligence makes use of selective scraping of data, in third-party database resources, relating to or associated with events or transaction recorded in the public (unregulated) wallet that belong to an initially unknown individual whose identity requires verification for linking purposes. In the event of a verified response to such a randomly generated query, a non-transferrable NFT is generated by the system intelligence of the regulated platform and these non-transferable NFTs are placed within an accessible public ledger as well as the purview of the private ledger. When sufficient correlation of responses occurs, linking can be established. The certificates provide a record of associations and go to the credibility and integrity of transactions, documents and wallet owners.

BRIEF DESCRIPTION OF THE DRAWINGS

Exemplary embodiments of the present invention will now be described with reference to the accompanying drawings in which:

FIG. 1B is a system architecture of a preferred embodiment, continued from FIG. 1a.

DETAILED DESCRIPTION OF A PREFERRED EMBODIMENT

Figure 1A:
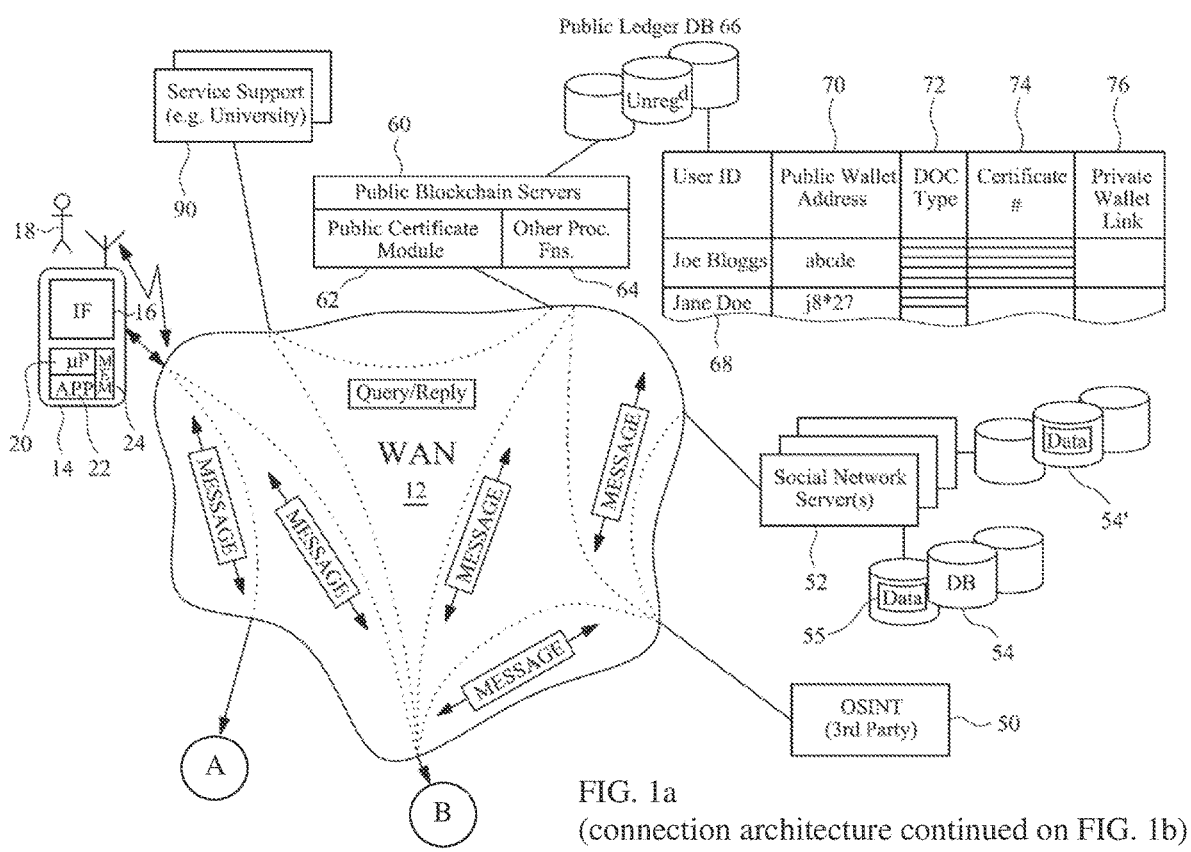
FIG. 1a is a system architecture of a preferred embodiment.
Figure 1B:
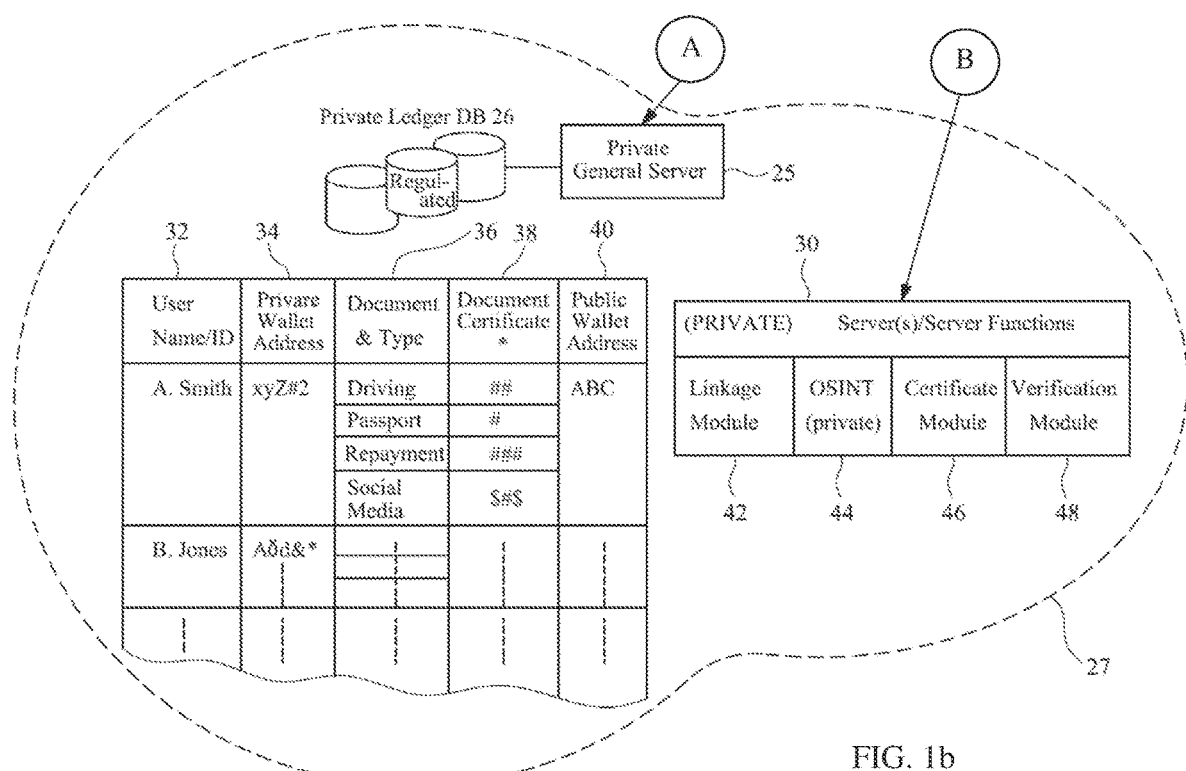

Referring to FIG. 1, there is shown a system architecture 10 of a preferred embodiment. The system architecture in based around a communications network 12, such as a wide area network, through which a multiplicity of servers, databases and client devices interact through any suitable messaging protocol, as will be readily appreciated. Server functionality may be localised but equally it may also be distributed, especially aspects that are based on the use of blockchain technology. FIG. 1 therefore provides an overview of the functions and high-level database content without being limited to the specific structures shown. Messaging into, through and out of the network 12 may be supported by wireless and/or wireline communication protocols with all messaging preferably being securely end-to-end encoded on a point-to-point basis.

In more detail, the system will include multiple client devices 14, although for simplicity of the diagram only a single client device is shown. The client device 14 may be a smartphone or a computer or the like. The client device 14 includes an interface 16 through which a user 18 can enter and receive data. The user interface will include a display and other input/output devices, as is conventional. The client device also includes processing intelligence 20 that controls operation of the device, and which executes programs and/or apps 22 stored in memory ("mem") 24. Functional software used by the client device may be web-based, i.e., supported by a browser. The operational software may be based on artificial intelligence that permits interpretation of data and an evaluation of user credibility based on a threshold score derived or implied from available data.

A private ledger database 26 is part of a regulated platform 27 in which user identification is validated. The regulated platform thus includes one or more servers 30 supporting local and/or distributed processing as required, for example, in relation to cryptocurrency banking systems [such as those provided by the company Tintra] that make use of private blockchain technology. Server functions, which are explained below in terms of interactions and effects, include:

i) a linkage module function 42;

ii) an open-source intelligence "OSINT" module 44, although this is optional and may be replaced or supplemented by a third-party external OSINT 50 to the private server but accessible via the network 12;

iii) a certificate module 46 for issuing hashed certificates; and iv) a verification module 48 which, again, is optional and dependent upon how linking between a regulated private wallet and one or more unregulated public wallets is validated for an identified common user.

The private ledger 26, of the regulated platform, typically includes for each registered user:

i) a username/unique identity 32;

ii) a private wallet address 34 (such as supported by blockchain) linked to the username/unique identity 32;

iii) a document description 36 identifying the nature of different forms of documents held in the private wallet address 34;

iv) a unique secure hash 38 coded for a document certificate issued against each type of document stored within a wallet; and a v) at least one link 40 to one or more public wallets supported on one or more unregulated platforms, such as Ethereum and Tezos.

Registration of each user 18 into the regulated platform is based on establishing proof of identity. This is a conventional process for regulated systems and is well-known to typically include provision of official original or certified documents, biometric data entry, proof of recent residence and/or proof of existing employment. Other validation metrics exist. The point is simply that the private platform, e.g., Tintra account and Tintra cryptocurrency wallet, has a confirmed real person as owner and which real person is appropriately validated by substantiating documentation compliant with legislation.

As indicated above, at least one independent third-party external OSINT module 50 [in the sense that the third-party OSINT module is outside of the regulated private platform] may be connected to the network 12. Irrespective of whether the OSINT modules is internally located within a private/regulated platform or externally and independent, the OSINT module 44, 50 operates as a backend application programming interface "api" arranged, in response to available personal data, to scrape additional personal data from one or more different source databases through one or more publicly available independent servers. For example, given a social media account, the OSINT module may fetch named photographic data posted on the social media account, or other information including (but not limited to) employment, education, family history and onwards into convictions and other personal data (such as high-level insurance policy information), etc. In FIG. 1, these data sources are represented by social media server 52 and connected database 54, with user data typically self-entered into the database by an identifiable user having some form of public account, such as a Facebook® page or other searchable online record, such as a LinkedIn® business account. Whilst the OSINT module 46, 50 is described as having access to public databases, it may also have approved access to private databases and thus personal confidential information.

The system of FIG. 1 further includes public blockchain servers 60 such as those supporting the Ethereum platform described above. At least one of these public servers (on a non-regulated platform) include a public certificate module 62 as well as other functional processing technology 64. The public blockchain servers 60 have access to a public database ledger 66 in which is stored, as a minimum, a public wallet address 70 for a user account and non-transferable NFTs (typically obtained by writing a smart contract).

The public database ledger 66 may include additional information such as NFTs (and all that they represent) and transaction histories. An optional user account identity 68 and related information may be included but generally, for the reasons given above, this is not the case for current blockchains. The non-transferable NFT placed onto the unregulated wallet are, in effect, a permanent record for a description 72 of document types (e.g., driving license, credit report, passport) and a secure certificate code hash 74 unique to each document. Each non-transferable NFT is written to the account by a public certificate module 62 in response to (in one path) the certificate module 46 in the private platform 27. For example, a smart contract on the public blockchain server(s) 60 would permit a private wallet address to be basis for the generation (by the certificate [issuance] module 46 in the private regulated platform 27) of certificates and related descriptions that verify the legitimacy of documents that unequivocally are attributable/link to a verifiable identity of a real person who owns/accesses the address of the unregulated wallet. Further, the smart contract would permit the storage of these unique non-transferable NFTs, and limited subsequent access. More specifically, the nature of each non-transferable NFT is that it cannot be moved from the unregulated wallet or in any way changed by any interaction other than an interaction directly involving the linked regulated wallet.

Finally, the system 10 of FIG. 1, can include further service providers having general access privileges to public space, such privileges supported by servers and databases of the service provider. For example, the service provider could be a university admissions department or an on-line retailer. The nature of the interaction with the functional aspects of the system, particularly in the context of the obfuscation of verified personal data, will be described subsequently.

The public wallet may include coins or tokens of value, including cryptocurrencies and NFTs.

Figure 2:
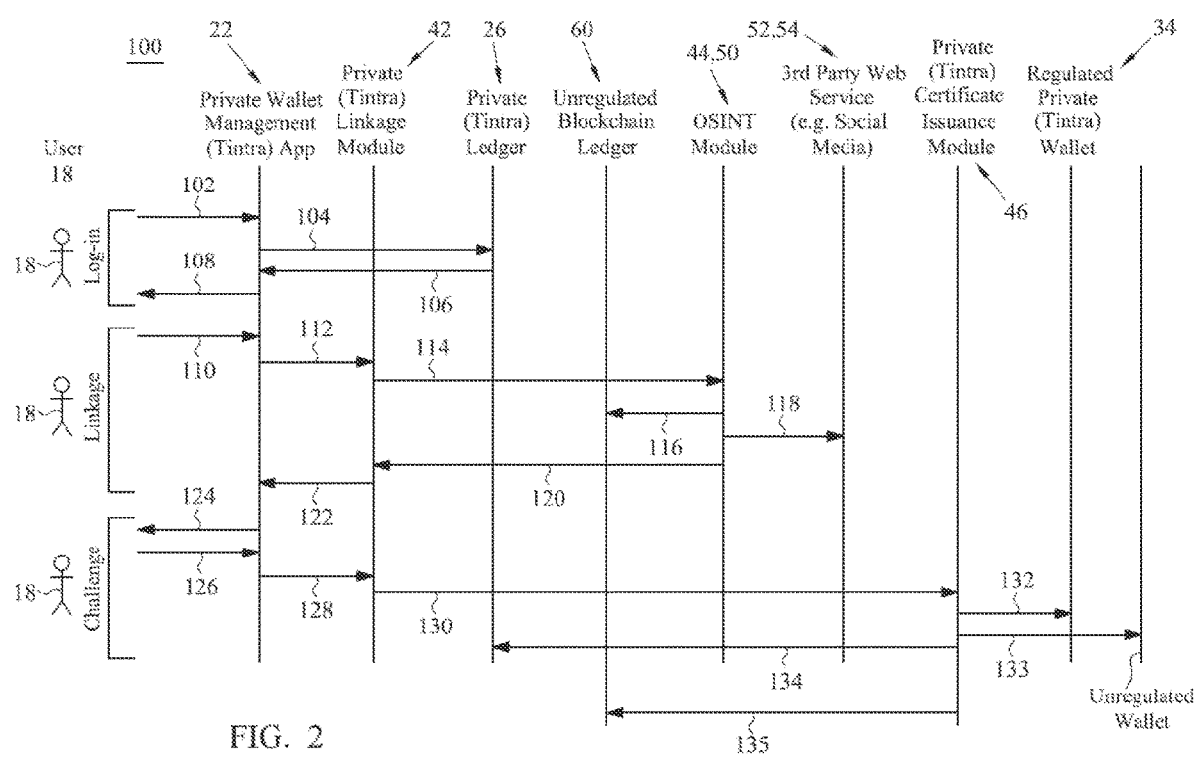
FIG. 2 is a function interaction flow process diagram showing preferred messaging interactions and content delivery between functional blocks within the system architecture of FIG. 1.

FIG. 2 is a function interaction flow process diagram 100 showing preferred messaging interactions and content delivery between functional blocks within the system 10 of FIG. 1. References to performance of functions by specific software/program modules on servers with the system of FIG. 1 should therefore be understood to include the generation of push and pull messages and/or query and return messages in a data message format suitable for the communication network, e.g., encoded packet-based data messages.

The different registration processes for a regulated and non-regulated wallet are well documented, are outlined generally above and regardless are well-known. In the context of the invention, it is sufficient to understand that establishing a regulated on-line currency account (such as provided by Cex.io—Bitcoin & Cryptocurrency Exchange & Trading—Buy & Sell Crypto—CEX.IO—and Tintra) requires user identity verification and that verification requirements can vary between different platforms. Conversely, an unregulated wallet which can include NFTs, can be obtained using a less stringent process that seldom if ever requires, during set-up and use, any form of account holder identification other than an account name (which could be a pseudo-name) and/or limited other data, such as a pay-as-you-go mobile phone number acquired with an off-the-shelf SIM purchase. As indicated above, non-regulated accounts, such as Ethereum, can therefore be established without any identity verification and indeed without a correlation to a real-world individual.

For each piece of verification data supplied by the user [for KYC and account opening purposes] and stored in the private ledger database 26 against (i) a document description and original document data 36 that articulates the nature and content of the verification data [such as a passport number, biometric data, a driving license number and/or other personal data such as jobs and employment dates, home addresses and dates and/or surnames of parents, etc.], against (ii) a regulated account identifier 32 for the user 18, and/or against (iii) a unique private wallet address 34, system intelligence within the domain of the regulated platform generates and stores a unique document certificate 38. The storage of the document content and document nature data 36 may be on a separate database which can be remote from the private ledger. The storage location is a design option and determined by whether the personal data 36 has wider but potentially confidential uses.

Preferably, the document certificate is in the form of an encrypted hash, such as an exemplary 256-bit hash for an SHA-2 cryptography structure. Consequently, each regulated wallet (simplistic account addresses "xyz #2 . . . " and "Aγδ$* . . . " for respective user/account names A. Smith and B. Jones in the simplistic and exemplary data table of FIG. 1, noting that addresses are conventionally hexadecimal of varying length) will contain a plurality of different unique document certificate hashes 38, with each hash mapped to a specific form of verifying document needed to establish the account. Consequently, the certificate hashes (or whatever securely encrypted form the certificates take) provide a yardstick measure of trust for the regulated wallet.

One of the issues addressed by the embodiments of the present invention relates to the establishment of an appropriate level of trust in the owner of the unregulated account, and how the level of trust (i.e., a KYC concern) can be surpassed to permit an unregulated wallet to be linked with a regulated wallet, thereby allowing access to the summed level of value held in all linked wallets whilst ensuring that integrity of the regulated platform [in which the regulated wallet operates] is not compromised.

Regardless of whether the wallet is a regulated wallet or an unregulated wallet, the skilled person will appreciate that there will typically be a private key/private log-in process that allows a user to open the respective wallet.

A) Regulated Account Log-In

On their computer or smartphone 14, the user instantiates 102 the banking app 22 to effect sign-in into their regulated wallet on the regulated platform 27. The app 22—or other form of software—may be locally stored in memory or accessed in an active web session, with sign-in conducted using the interface 16. In response to the sign-in request [and assuming that the sign-in is validly authenticated for a valid regulated wallet address], a general server 25 for the regulated platform accesses 104 the private ledger database 26 to locate and return 106 prior stored wallet contents which, in additional to a stored cryptocurrency balance, may include certificates and related descriptions associated with specific activities that have been concluded successfully through operation of the regulated wallet. The information supplied to the client's device, e.g., the smartphone 14, is displayed to permit instructions to be sent into the general server 25, as will be understood. All this is conventional.

B) Linkage of an Unregulated Wallet to a Regulated Wallet

The preferred embodiment supports a user-driven request for linkage to be established with an unregulated cryptocurrency wallet distributed in an unregulated platform. To achieve this, the user firstly enters/adds 110 a wallet address (of an unregulated platform) into the app 22. [Evidently, this wallet address must pre-exist and be valid.]

The first issue to be addressed is how can the system be suitably certain that the pre-existing unregulated wallet address belongs to a bona fide individual with satisfactory financial integrity?

The app 22 firstly interacts with the linkage module 42 by forwarding 112 the address of the unregulated wallet. The linkage module communicates 114 the address of the unregulated wallet to the OSINT module 44, 50, with the OSINT module 46, 50 arranged to verify the unregulated cryptocurrency wallet address on unregulated (public) blockchain ledger 66, e.g., Ethereum or the like. Particularly, from the unregulated ledger 66, the OSINT module retrieves at least one and generally a plurality of candidate identifying data entries that are stored/listed within the unregulated wallet. Preferably, the OSINT module pulls 116, i.e., interrogates, the wallet to identify all wallet usages (i.e., transactional entries or recorded interactions and uses) to identify candidate identifying data entries. These candidate data entries may be NFTs but generally will be personal data relating to social and/or commercial interactions of the [possibly unnamed] account holder of the unregulated wallet to other online entities.

Armed with candidate identifying data entries, the OSINT module 46, 50 is arranged to parse each candidate identifying data entry to identify searchable links to social media platforms 52 and/or third-party databases, and then to establish a link to those social media platforms and/or third-party database in order to scrape 118 related databases 54 for identifying personal data 55 (such as personal telephone numbers, employment history, transactions involving NFTs, cryptocurrency transaction histories and smart interactions and events stored in the ledger of the unregulated wallet, addresses of other unregulated wallets, user-related geographic locations, images/pictures, email addresses, public government data and company affiliations, etc.) and/or further links that lead to additional databases further down the chain and which are associated with any other previously returned information. The returned data to the OSINT module thus yields a profile of the owner of the unregistered wallet through the return thereto of scraped identifying data sources that can be used in a test to verify the identity of an individual having either ownership of or access to the address of the unregulated wallet, and thus related direct use of cryptocurrency through the unregulated wallet or indirect use of cryptocurrency by a secondary unregulated wallet traced by the inquisitions made by the OSINT module.

The OSINT module 46, 50 returns 120 identifying data sources to the linkage module 44 of the private server(s) 30 in the regulated platform 27.

The identifying data sources that are independently scraped from outside of the regulated platform 27 can now be used internally with the regulated platform to assess whether the KYC verified account holder of the regulated wallet is the same as the actual account holder/user of the unregulated wallet. For example, embodiments may use web 2.0 opensource tech to scrape information about a person who own the unregulated public wallet (such as an Ethereum wallet) to provide insight, based on a generated honesty score for replies or commonly existing pre-registered data, as to whether the public unregulated wallet belongs to one and the same person.

As an alternative to the user 18 providing the address of the unregulated (Ethereum) wallet, an alternative process could involve the user logging into the regulated system and the system leveraging the existing KYC data used to establish the regulated account. In this arrangement, server functionality (e.g., the linkage module 42) uses selected data (such as an email address or other verified personal information) to engage the OSINT function to cause that function to search for unregulated wallet(s) addresses linked to KYC verified data. The alternative system therefore eliminates the need for the user to provide the address of the unregulated wallet. From this point onwards, the regulated/unregulated wallet linkage mechanism is as described above in the preferred embodiment.

Since the private ledger database 26 contains a record of submitted documents verified during KYC and AML clearance during set-up of the regulated wallet for a specific account holder, OSINT returned identifying data sources can be cross-referenced to and compared 122 with pre-existing document type and document content 36 whether stored in the private ledger database 26 or stored securely elsewhere, as indicated above. If there is a match between an item of the identifying data sources and the document type and pre-stored verified document content 36 for KYC/AML, then the already existing and corresponding unique document certificate hash for the specific document [used for KYC and AML for the regulated wallet in the regulated platform 27] can be returned to the linkage module 42 to ensure a closing of the enquiry. If there is a sufficient number of OSINT-returned identifying data sources that match precisely with corresponding pre-stored document types and document content 36 entries, then this in itself can justify linking of the regulated wallet to the unregulated wallet.

The number or type of matches needed can be selected to reflect the level of trust, termed an "honesty score", deemed necessary to establish wallet linkages. Setting the threshold at a relatively high number of positive matches means that greater axioposity is established for the personal credentials of the KYC-approved owner of the regulated wallet as correlating with those of the user of the unregulated wallet. Different categories of document may attract different weighting to the cumulative score, i.e., a driving license may be allocated a score of twenty whilst an email address may attract a value of one unit.

The cumulative threshold can therefore be achieved in a differing number of ways, and the threshold set at differing levels to reflect perceived overall risk of the owner of the regulated and unregulated wallets being the same individual.

The system intelligence is configured to record the determination of such common ownership in both the private ledger database 26 and the public ledger database 66 with recording of appropriate cross-lining addresses 40, 76 stored in the respective wallets.

Alternatively or complementarily, returned identifying data sources for which there is no corresponding pre-stored and pre-certificated data, as established by the linkage module 42 interrogating the private ledger database (or associated database in which the KYC data 36 is stored), can be used as a direct challenge 124 to the user 18 logged into to the regulated wallet via the app 22.

More particularly, the linkage module 44 creates one or more challenges 122 (based on the scraped identifying data sources) that require a confirmatory response through the app 22 during logged-on activity. For example, if the returned identifying data sources return an employment history, system intelligence (based for example on natural language processing "NLP" term extraction in an AI environment) may pose a question concerning employment dates with a particular company. Alternatively, if the returned identifying data sources is a telephone number, the query could require the insertion of deliberately obscured digits. Similar challenge queries can be formulated, as will be appreciated, for transactions involving NFTs, cryptocurrency transaction histories and smart interactions and events stored in the ledger of the unregulated wallet, addresses of other unregulated wallets, user-related geographic locations, images/pictures and particularly tags for locations or individuals present, email addresses, public government data and company affiliations, etc. If the linkage module receives a response 124 via the app 22 and the response to the query is correct and, preferably, delivered within a time window set for response, then this represent new identity verification data that is another step towards legitimizing user of the unregulated wallet as being the same individual who is the owner of the regulated wallet. The app 22 can return the response directly for the linkage module to assess, or otherwise it may return a match/no-match result based on local comparison of the response relative to the expected response supplied to the app as part of the query generation function at the linkage module.

If the response to the query through the app is false (or timed out), then the system intelligence concludes either that the respondent user 18 cannot be trusted to the extent that a link between the registered and unregistered accounts cannot be justified, or otherwise that at least one further challenge based on returned identifying data sources must be made and correctly answered. In the event that the user 18 correctly responses through the app 22, then the linkage module can either (i) raise further queries to increase confidence in the identity of the respondent user 18, or (ii) accept that a sufficient level of trust has been associated that warrants linkage of the regulated and unregulated wallets. Linking of wallets follows the procedure described above.

Any correct reply to the query is stored in a database, such as but not limited to the private ledger database 26, with the reply cross-referenced to the document type. In this way, an appreciation of the user's activities is grown and the fields of document type and document content 36 and related certificates expanded with time.

The linkage module 42, in response to a valid answer to a query, is thus further preferably arranged to send 130 the certificate module 46 (within the regulated platform) data relating to the nature of the query (e.g., document type) and the accurate user-supplied response. The certificate module 46 generates a new coded hash for the specific content and identified nature of the identifying data source query and its correct response, and links 132 this certificate to the relevant regulated private wallet address 34.

The certificate module 46 can now cross-reference and mint the certificate [relating to the returned data from the OSINT module] into at least one of:
  (i) the private ledger database and, typically, in a look-up table or the like (flow 134 of FIG. 2). Assumingly that the requisite honesty score is met, then use of the unregulated wallet in the regulated environment will be enabled. The certificate would be a non-transferable NFT;
  (ii) the public ledger database (flows 133 and 135 of FIG. 2) for the relevant unregulated wallet. This would increase direct public visibility of information/data related to the owner of the unregulated wallet, and confirms that the certificate has been validated in a regulated environment, thereby increasing levels of trust in public data. The certificate would be a non-transferable NFT;
  (iii) minting duplicates of the certificate(s) generated for the KYC/AML process(es) [needed to validate the authenticity of the user and establish the regulated wallet] into the linked unregulated public wallet, with these certificates again presented as non-transferable NFTs; and/or
  (iv) both the private ledger database and the public ledger database for the reasons explained immediately above.

Linkage Via a Hard Wallet

According to an alternative linking embodiment, the initial linking of private and public wallets on respectively regulated and unregulated platforms can be achieved using the following approach. The private cryptocurrency wallet is established by processes which satisfy KYC and AML requirements; these are known and outlined above. The verified user of the private wallet instantiates the app 22 and logs-in via the interface (reference numeral 16 of FIG. 1) and identifies, for example, an Ethereum address. Should the verified user 18 of the private wallet then contemporaneously engage a hard wallet device containing a private key for an unregistered public cryptocurrency wallet, the reported contemporaneous logins establish, via message handshaking (e.g., through interactions with the app 22), that there is a commonly known user and that the wallets can be linked/associated as described above. Particularly, the respective private ledger database and public ledger database appropriate are uploaded with cross-references to the respective wallets. The same principle may be applied to a browser-based software wallet.

Secure Verification of Personal Data

In linking a regulated wallet to an unregulated wallet, the system of the present invention therefore generates and updates a public ledger 66 with one or more unique non-transferable NFTs each including a hash relating to specific documents or activity of user with a verified identity. The issued/minted non-transferable NFTs are thus locked to an individual and the individual is locked to the private regulated wallet. This means that the public wallet data is expanded to include a coded hash 74 (stored on the non-transferable NFT) for a new document type and that any interrogation of the public unregulated wallet or, if accessible or otherwise linked, the private server(s) functions 30 of the regulated platform, reveals that a regulated platform has pre-confirmed the veracity and accuracy of the document type and its content. If a query is sent, for example, from a university admissions department (e.g., "service provider" 90 of FIG. 1) asking, via electronic messaging and server interaction, whether Jane Doe received a degree from Oxford University in 2021, then the existence of the document type and hash (on the non-transferable NFT) establish that the document has been previously verified by a secure regulated platform 27. The verification process may be coordinated through a dedicated verification module 48 (of FIG. 1), with this meaning that the hash is copied and sent back to the minting agent that will then confirm that the hash—and thus the document—are pre-authenticated. This approach to/within the minting agent is optional and is a supportive level of security. The presence of the hash and non-transferable NFT in the unregulated wallet may be taken as sufficient in itself.

In practice, the owner of the unregulated wallet logs into the service provider's website and, via the service provider's interface, signs into the owner's unregulated wallet. The service provider is thus given access to the wallet, via the log-in, to scrape publicly available data associated with the unregulated wallet. Particularly, the service provider can identify a document class or category in the public wallet and then acknowledges and thus establishes the existence, via messaging over a public network, of the related hash. Since the hash is a secure code and the hash is only produced in response to a verification of the unregulated wallet into a regulated wallet in a regulated system, the existence and/or provision/copy of the hash substantiates the authenticity of the personal data without the need to communicate personal data from the service provider and across a public network 12. The service provider does not therefore need to independently verify the authenticity of personal data that has already been checked by and linked to the regulated system and, in fact, the service provider needs no access to the regulated system and private ledger thereof.

This obfuscation ability is particularly useful for expediting electronic delivery of personal documents whilst maintain as secret the content of such documents. Putting this differently, the supply of a hash generated by a regulated platform 27 for a particular document establishes the veracity of the data with no further checks or communication necessary once the certificate hash has been returned to address the service provider's query.

The provision of a certificate/hash response therefore verifies that the latter supplied document under investigation has been previously authenticated by a regulated platform compliant with AML and KYC, and thus avoids the sending of a potentially confidential and/or lengthy (and therefore data sizeable) document to the querying service provider.

Unless specific arrangements are mutually exclusive with one another, the various embodiments described herein can be combined to enhance system functionality and/or to produce complementary functions or system that support the effective identification of user-perceivable similarities and dissimilarities. Such combinations will be readily appreciated by the skilled addressee given the totality of the foregoing description. Likewise, aspects of the preferred embodiments may be implemented in standalone arrangements where more limited functional arrangements are appropriate. Indeed, it will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions. In terms of the suggested process flows of the accompanying drawings, it may be that these can be varied in terms of the precise points of execution for steps within the process so long as the overall effect or re-ordering achieves the same objective end results or important intermediate results that allow advancement to the next logical step. The flow processes are therefore logical in nature rather than absolute. The functional architectures of, for example, FIGS. 1 to 3 may be implemented independently on one another, as will be understood. Further, in terms of the system's distributed functions and, particularly, the system intelligence used to implement the various interactive messaging protocols, data calls and queries, these can be located one or multiple servers within, usually, the regulated platform. The private server/server functions block of FIG. 1 should, consequently, be viewed functionally as a block to typical operational functions. In this regard, labels such as "linkage module" and "certificate module" should be understood to be descriptive tags for the specific functionality and related interactions.

It will, of course, be appreciated that the above description has been given by way of example only and that modifications in detail may be made within the scope of the present invention. For example, whilst the exemplary embodiment has focused on digital accounts that, generally, will contain or support transactions using cryptocurrencies, the concepts and approaches to linking and identity verification, especially using a scraped deeper-dive approach to different data sources, applies in general to linking of regulated with unregulated accounts of any nature.

The invention claimed is:

1. A method of verifying authenticity of specific personal data based on supply of a wallet address stored on a public ledger database of an unregulated platform, wherein the public ledger database contains a first wallet having a unique address and containing one or more non-transferable non-fungible tokens "NFTs" locked to the first wallet and wherein each non-transferable NFT was minted from a regulated platform to which there is a record in the public ledger database and each non-transferable NFT includes a hash that verifies a nature of a related document and wherein each non-transferable NFT cannot be moved from the unregulated wallet or in any way changed by any interaction other than an interaction directly involving a related linked regulated wallet on the regulated platform, the method comprising:
    supplying the unique address of the first wallet to a service supplier to affect a log-in of the service provider into the first wallet;
    through message interaction over a network between the service supplier and the unregulated platform, searching for a record of specific personal data in the public ledger database to locate non-transferable NFTs stored in the first wallet and related to the specific personal data; and
    at the service supplier, verifying authenticity of the specific personal data through inspection, over the network and from the first wallet, of the hash stored on each non-transferable NFT whereby existence of the hash verifies authenticity of the specific personal data.

2. The method of claim 1, wherein linking of the first wallet on the unregulated platform through said minting of non-transferable NFT associated with a known client of a regulated digital wallet on said regulated platform further comprises:
    during establishment of the regulated digital wallet, generating an encoded certificate for each of a plurality of personal documents submitted electronically to the regulated platform to satisfy regulatory requirements for establishing the regulated digital wallet in the name of the known client, and storing in the regulated trading platform an association between the encoded certificate and the regulated digital wallet;
    minting each said generated encoded certificate to produce said non-transferable NFTs locked to the first wallet of the unregulated platform; and
    establishing a relationship between the first wallet and the regulated digital wallet when said non-transferable NFTs are within the first wallet to verify and record common ownership of the first wallet and the regulated digital wallet with the known client.

3. The method of claim 1, wherein linking of the first wallet on the unregulated platform through said minting of non-transferable NFT associated with a known client of a regulated digital wallet on said regulated platform further comprises:

verifying an identity of a prospective account holder seeking to establish a first regulated digital wallet by authenticating a plurality of instances of personal data submitted by the prospective account holder;

issuing, as a hash, a certificate for each instance of personal data and associating, in a private ledger database of the regulated platform, each hash with at least a document type and the regulated digital wallet to establish a cryptocurrency account for the prospective account holder;

using the plurality of instances of personal data to identify at least one link to the first wallet having the unique address;

using said at least one link, automatically interrogating the first wallet to recover data entries in the first wallet that reflect at least one of transactional entries, recorded wallet interactions, NFTs, general personal data and uses of cryptocurrency;

based on said recovered data entries, identifying searchable links to third-party databases independent of the unregulated platform and independent of the regulated platform, scraping said third-party databases for personal data or further links related to operation of the first wallet, and returning scraped data to generate a profile of a registrant of the first wallet;

based on the profile, parsing said returned scraped data to generate a list of different document types each with a respective associated document;

within the private ledger database, identifying any commonality between said list of different document types and the document type linked to the first digital wallet;

in the event that there is at least one identified commonality in the document type and a content match exists between the respective associated document and a verified document associated with the regulated digital wallet, evaluating an honesty score associated with the content match; and determining if the honesty score exceeds a threshold and, when it does, linking the first wallet to the regulated digital wallet by minting the non-transferable NFT and storing said non-transferable NFT in at least the first wallet.

4. The method of claim 3, wherein the returned personal data is at least one of: a personal telephone number, an employment history, transactions involving NFTs, cryptocurrency transaction histories, smart interactions, events stored in the ledger of the unregulated wallet, addresses of other unregulated wallets, user-related geographic locations, images/pictures, email addresses, public government data, and company affiliations.

5. The method of linking according to claim 3, further comprising:

in the event of failing to identify commonality, generating at least one random challenge from selected content in said returned scraped data and displaying the at least one random challenge on the interface of the app;

monitoring a response to the at least one random challenge and assessing correctness of the response;

in the event of correlation of the response to the selected content of the random challenge, generating a second hash for the selected content;

associating the second hash with at least one of the first regulated digital wallet and the first unregulated digital wallet; and using the second hash to verify a common ownership of the first regulated digital wallet and the first unregulated digital wallet.

6. The method of linking according to claim 5, wherein said minted non-transferable NFT is further stored in the first regulated digital wallet of the private ledger database.

\* \* \* \* \*